US012551727B2

(12) United States Patent
Ravkilde et al.

(10) Patent No.: US 12,551,727 B2
(45) Date of Patent: Feb. 17, 2026

(54) SYSTEM AND METHOD FOR DOSE GUIDANCE AND REPEATED ESTIMATION OF FINAL DELIVERED RADIATION DOSE FOR A RADIOTHERAPY SYSTEM

(71) Applicant: Ardos ApS, Nørager (DK)

(72) Inventors: Thomas Lyhne Ravkilde, Nørager (DK); Per Rugaard Poulsen, Åbyhøj (DK); Casper Gammelmark Muurholm, Aarhus V (DK); Simon Skouboe, Risskov (DK); Paul John Keall, Greenwich (AU)

(73) Assignee: Ardos ApS, Nørager (DK)

( * ) Notice: Subject to any disclaimer, the term of this patent is extended or adjusted under 35 U.S.C. 154(b) by 250 days.

(21) Appl. No.: 18/272,962

(22) PCT Filed: Jan. 26, 2022

(86) PCT No.: PCT/EP2022/051766
§ 371 (c)(1),
(2) Date: Jul. 18, 2023

(87) PCT Pub. No.: WO2022/162010
PCT Pub. Date: Aug. 4, 2022

(65) Prior Publication Data
US 2024/0123259 A1    Apr. 18, 2024

(30) Foreign Application Priority Data
Jan. 26, 2021    (EP) .................................... 21153429

(51) Int. Cl.
*A61N 5/10*    (2006.01)
(52) U.S. Cl.
CPC .........  *A61N 5/1071* (2013.01); *A61N 5/1031* (2013.01); *A61N 5/1037* (2013.01);
(Continued)

(58) Field of Classification Search
CPC ........ A61N 5/10; A61N 5/103; A61N 5/1031; A61N 5/1037; A61N 5/1039;
(Continued)

(56) References Cited

U.S. PATENT DOCUMENTS 7,574,251 B2 *   8/2009  Lu .......................... A61N 5/1031
                                                                600/411
7,853,308 B2 * 12/2010  Sauer ................... A61N 5/1049
                                                                 378/65
(Continued)

FOREIGN PATENT DOCUMENTS

EP    2116277 A1    11/2009
EP    1392397 B1     5/2016
(Continued)

OTHER PUBLICATIONS

Carolan, Martin G, Pencil Beam Dose Calculation Algorithm; Illawarra Cancer Care Centre; Nov. 10, 2010, 2 pages.
(Continued)

*Primary Examiner* — Allen C. Ho
(74) *Attorney, Agent, or Firm* — DINSMORE & SHOHL LLP

(57) ABSTRACT

A method for dose guidance for a radiotherapy system during a radiotherapy session includes the steps of: performing substantially real-time dose reconstruction to obtain a delivered radiation dose generated by a radiotherapy beam of the radiotherapy system in at least one volume; repeatedly estimating a remaining radiation dose based on an observed and/or simulated motion of the at least one volume; repeatedly estimating a final delivered radiation dose as a sum of the delivered radiation dose and the estimated remaining radiation dose; and providing dose guidance for a remaining part of the radiotherapy session based on the estimated final delivered radiation dose. A method of continuous estimation of final delivered radiation dose during a radiotherapy (Continued)

session and a decision support system for a radiotherapy system are also provided.

20 Claims, 12 Drawing Sheets

(52) U.S. Cl.
CPC ......... *A61N 5/1048* (2013.01); *A61N 5/1064* (2013.01); *A61N 5/1065* (2013.01); *A61N 5/1068* (2013.01); *A61N 5/1069* (2013.01); *A61N 2005/1072* (2013.01); *A61N 2005/1074* (2013.01)

(58) Field of Classification Search
CPC .. A61N 5/1047; A61N 5/1048; A61N 5/1049; A61N 2005/1052; A61N 2005/1054; A61N 2005/1059; A61N 2005/1061; A61N 2005/1062; A61N 5/1064; A61N 5/1065; A61N 5/1067; A61N 5/1068; A61N 5/1069; A61N 5/107; A61N 5/1071; A61N 2005/1072; A61N 2005/1074
USPC .......................................................... 378/65
See application file for complete search history.

(56) References Cited

U.S. PATENT DOCUMENTS

| | | | | |
|---|---|---|---|---|
| 8,073,102 B2* | 12/2011 | Fallone | ................. | A61N 5/103 378/65 |
| 8,229,068 B2* | 7/2012 | Lu | ....................... | A61N 5/1049 378/65 |
| 8,363,784 B2* | 1/2013 | Sobering | .............. | A61N 5/1031 378/65 |
| 8,406,844 B2* | 3/2013 | Ruchala | ................. | A61N 5/103 378/65 |
| 8,467,497 B2 | 6/2013 | Lu | | |
| 8,509,383 B2* | 8/2013 | Lu | ....................... | A61N 5/1049 378/65 |
| 8,767,917 B2* | 7/2014 | Ruchala | .............. | A61N 5/1049 378/65 |
| 9,188,654 B2* | 11/2015 | Nielsen | ................ | A61N 5/1071 |
| 10,434,338 B2* | 10/2019 | Sayeed | ................ | A61N 5/1039 |
| 10,441,819 B2* | 10/2019 | Sayeed | ................ | A61N 5/1071 |
| 10,625,100 B2* | 4/2020 | Berbeco | .............. | A61N 5/1067 |
| 10,668,304 B2* | 6/2020 | Magro | ................. | A61N 5/1071 |
| 10,688,320 B2* | 6/2020 | Voronenko | ........... | A61N 5/1045 |
| 10,850,123 B2* | 12/2020 | Liu | ...................... | A61N 5/1031 |
| 11,141,609 B2* | 10/2021 | Tilly | .................... | A61N 5/1067 |
| 11,154,269 B2* | 10/2021 | Shea | ........................ | A61B 6/06 |
| 11,247,071 B2* | 2/2022 | Swerdloff | ............ | A61N 5/1081 |
| 11,376,446 B2* | 7/2022 | Nguyen | ................ | A61N 5/1037 |
| 11,433,257 B2* | 9/2022 | Givehchi | ............. | A61N 5/1071 |
| 11,504,550 B2* | 11/2022 | Maolinbay | ........... | A61N 5/1081 |
| 11,524,178 B2* | 12/2022 | Vija | ..................... | A61N 5/1031 |
| 11,596,807 B2* | 3/2023 | Maurer | ................ | A61N 5/1031 |
| 11,648,418 B2* | 5/2023 | Owens | ................. | A61N 5/1039 378/65 |
| 11,651,848 B2* | 5/2023 | Kuusela | ............... | A61N 5/1038 600/1 |
| 11,654,300 B2* | 5/2023 | Olcott | .................. | A61N 5/1067 378/65 |
| 11,801,398 B2* | 10/2023 | Voronenko | ............. | A61N 5/103 |
| 11,896,848 B2* | 2/2024 | Janardhanan | ........ | A61N 5/1082 |
| 12,059,580 B2* | 8/2024 | Nguyen | ................ | A61N 5/1049 |
| 12,161,887 B2* | 12/2024 | Hasegawa | ............ | A61N 5/1067 |
| 12,201,852 B2* | 1/2025 | Smith | ................... | A61N 5/1037 |
| 12,274,895 B2* | 4/2025 | Tilly | .................... | A61N 5/1071 |
| 2009/0116616 A1 | 5/2009 | Lu et al. | | |

FOREIGN PATENT DOCUMENTS

| | | |
|---|---|---|
| WO | 2007045075 A1 | 4/2007 |
| WO | 2009055801 A2 | 4/2009 |
| WO | 2009114669 A1 | 9/2009 |
| WO | 2014056831 A1 | 4/2014 |
| WO | 2016029917 A1 | 3/2016 |

OTHER PUBLICATIONS

ESTRO 33, Congress Report, www.estro.org, dated Apr. 2014, 34 pages.
Han-Oh, Sarah, Verification of MLC based real-time tumor tracking using an electronic portal imaging device, Medical Physics 37, 2435 (2010); doi: 10.1118/1.3425789, 7 pages.
Muurholm, Casper Gammelmark, Real-time dose-guidance in radiotherapy: Proof of principle, Radiotherapy and Oncology 164 (2021), 175-182.
Skouboe, Simon, First clinical real-time motion-including tumor dose reconstruction during radiotherapy delivery, Radiotherapy and Oncology 139 (2019) 66-71, 6 pages.
Wendling, Markus, A fast algorithm for gamma evaluation in 3D, Med. Phys. 34(5), May 2007, 1647-1654.

* cited by examiner

# SYSTEM AND METHOD FOR DOSE GUIDANCE AND REPEATED ESTIMATION OF FINAL DELIVERED RADIATION DOSE FOR A RADIOTHERAPY SYSTEM

CROSS-REFERENCE TO RELATED APPLICATIONS

This application is the U.S. National Stage of PCT/EP2022/051766 filed on Jan. 26, 2022, which claims priority to European Patent Application 21153429.2 filed on Jan. 26, 2021, the entire content of both are incorporated herein by reference in their entirety.

FIELD OF THE INVENTION

The present disclosure relates to a system and a method for repeated estimation of final delivered radiation dose during a radiotherapy session. The disclosure further relates to a method for dose guidance for a radiotherapy system during a radiotherapy session. The method can be performed continuously and in substantially real-time during a radiotherapy session.

BACKGROUND OF THE INVENTION

Radiotherapy is therapy using ionizing radiation, generally as part of cancer treatment to control or kill malignant cells. Radiotherapy is commonly applied to the cancerous tumor because of its ability to control cell growth. In radiotherapy, precise delivery of the treatment dose is crucial in order to maximize the ratio between tumor dose and normal tissue dose to effectively cure the patient with minimal side effects. Dose reconstruction is the process of estimating radiation doses received by objects or individuals.

During radiotherapy the targeted object and the surrounding areas may move, rotate or deform for different reasons. As an example, lung tumors may move with respiration, but also for other reasons, such as movement of the patient with respect to the radiation beam or internal movement in or between organs. Some motions/rotations/deformations are difficult to predict. In current radiotherapy of moving tumors/organs, substantial volumes of healthy tissue are often irradiated in order to ensure adequate treatment of the tumor. Organ motion during treatment delivery can lead to deterioration of the planned dose distribution.

The inclusion of motion/rotation/deformation in radiotherapy severely challenges the quality assurance (QA) protocols, including dose reconstruction, for the delivered doses. There are algorithms available that are capable of precise dose reconstruction, however, these algorithms are either too slow to be used in real-time due to computation time and/or are not capable of taking into account motion/rotation/deformation of the targeted object.

Image-guided radiotherapy (IGRT) seeks to correct for interfractional anatomical changes, i.e. changes between radiotherapy sessions, by aligning the anatomy in daily setup images with simulation images. The alignment is commonly based on the position of either bony or soft-tissue anatomy, or implanted fiducial markers. However, this geometrical alignment is a simplification based on an assumption of patient rigidity.

Similarly, researchers have investigated the concept of dose-guided patient positioning, where the dosimetrically optimal patient position is calculated based on the anatomy of the day. Similarly to IGRT methods, dose-guidance efforts have focused on interfractional anatomical changes observed in pretreatment images.

SUMMARY OF THE INVENTION

The present disclosure addresses the above challenges. According to a first embodiment, a method for dose guidance for a radiotherapy system during a radiotherapy session is provided. The method comprises the steps of:
  performing substantially real-time dose reconstruction to obtain a delivered radiation dose generated by a radiotherapy beam of the radiotherapy system in at least one volume;
  repeatedly estimating a remaining radiation dose of the radiotherapy session based on an observed and/or simulated motion of the at least one volume;
  repeatedly estimating a final delivered radiation dose for the radiotherapy session as a sum of the delivered radiation dose and the estimated remaining radiation dose for the at least one volume; and
  providing dose guidance for a remaining part of the radiotherapy session based on the estimated final delivered radiation dose.

The substantially real-time estimation of final delivered radiation dose allows informed decision-making on treatment interventions using the clinically relevant metric of absorbed dose instead of geometry.

A radiotherapy session typically includes a treatment plan for delivering a suitable dose to one or more target volumes while minimizing the dose to critical avoidance volumes. In the presently disclosed method for dose guidance, one process performs substantially real-time dose reconstruction for at least one volume. In this process, a cumulative dose distribution is delivered to the at least one volume until the current time point is continuously calculated.

In a second process, the method repeatedly estimates a remaining radiation dose of the radiotherapy session based on an observed and/or simulated motion of the at least one volume. This can be done by convolving the part of the pre-calculated planned dose that remains to be delivered with the motion observed so far. As a non-limiting example, it is possible to use motion of the volume observed in a time window of, for example, the past 40 seconds.

Having a repeatedly estimated cumulative dose and an estimation of the remaining radiation dose, the former being calculated in substantially real-time taking into account the actual motion of the volume, the latter being an estimation based on motion of the volume until the current time point, preferably also estimated in substantially real-time, it is possible to repeatedly estimate a final delivered radiation dose for the radiotherapy session as a sum of the delivered radiation dose and the estimated remaining radiation dose.

'Substantially real-time' in the context of the present disclosure has the meaning that the calculations can be carried out repeatedly during the radiotherapy session with sufficient accuracy and sufficiently high time resolution.

The continuous/repeated estimation of a final delivered radiation dose, which takes into account the observed motion, is a significant improvement of decision support for radiotherapy systems. The estimation of the final delivered radiation dose can be used for decision support and for dose guidance for the remaining part of the radiotherapy session. It allows repeatedly updated estimation of final dose volume histograms (DVH) of regions of interests during the radiotherapy session, which can be analyzed and shown during an on-going treatment. The real-time updated DVH parameters can be used in an optimization strategy where treatment adaptations, such as, for example, the couch correction that leads to an improved optimal final dose, can be found. Comparison of such estimated final doses with and without the dosimetrically optimal couch correction allows informed decision-making on, for example, intrafractional couch adaptations, i.e. adaptations within a radiotherapy session.

Dose guidance during radiation therapy can, generally, be seen as making use of the estimated final delivered radiation dose, and possibly other relevant information, such as observed or simulated motion, to improve the precision and accuracy of treatment delivery. Examples of dose guidance include providing patient position and/or couch position or correction and/or beam correction information that can be used to adjust and improve the remaining part of the radiotherapy session. This may include providing suggestions for couch correction or re-optimization of a treatment plan for the remaining part of the radiotherapy session.

The technology may be provided as a computer program with a graphical user interface. Through the user interface a treatment plan can be obtained. The computer program may also obtain feeds of linac parameters and tumor and organ motion. The computer program may provide continuous information regarding dose accumulated throughout a session, estimated remaining radiation dose of the radiotherapy session and estimating a final delivered radiation dose, with and without corrections.

The information may also be used for calculation of gating of the radiotherapy beam for the remaining part of the radiotherapy session or for a re-optimization of the treatment plan for the remaining part of the radiotherapy session. The estimated final delivered radiation dose allows informed decision making on treatment intervention based on the most relevant parameter, namely the final dose to the patient. It paves the way for new strategies for intrafractional motion adaptation based on the dosimetric state of the treatment delivery, where conflicting dose considerations to up to several targets and/or radiosensitive volumes at risk may be taken into consideration.

The present disclosure further relates to a method of continuous estimation of final delivered radiation dose during a radiotherapy session, comprising the steps:
performing real-time dose reconstruction to obtain a delivered radiation dose generated by a radiotherapy beam of the radiotherapy system in at least one volume;
repeatedly estimating a remaining radiation dose of the radiotherapy session based on an observed and/or simulated motion of the at least one volume; and
repeatedly estimating a final delivered radiation dose for the radiotherapy session as a sum of the delivered radiation dose and the estimated remaining radiation dose.

A person skilled in the art will recognize that the features and further embodiments described in the present disclosure are not limited to one of the methods but interchangeable. When, for example, a passage specifies that the motion may comprise a cyclic motion part, such as a substantially sinusoidal motion, and/or a baseline drift and/or an erratic motion part, this passage is valid both for the presently disclosed method for dose guidance for a radiotherapy system during a radiotherapy session and the method of continuous estimation of final delivered radiation dose during a radiotherapy session.

The present disclosure further relates to a computer program having instructions which, when executed by a computing device or computing system, cause the computing device or computing system to carry out one of the methods, and to a decision support system for a radiotherapy system comprising:
an interface for receiving radiotherapy beam parameters and/or parameters related to observed and/or simulated motion of at least one volume; and
a processing unit configured to:
a. perform real-time dose reconstruction to obtain a delivered radiation dose generated by a radiotherapy beam of the radiotherapy system in at least one volume;
b. repeatedly estimate a remaining radiation dose of the radiotherapy session based on an observed and/or simulated motion of the at least one volume; and
c. repeatedly estimate a final delivered radiation dose for the radiotherapy session as a sum of the delivered radiation dose and the estimated remaining radiation dose.

DETAILED DESCRIPTION OF THE INVENTION

The present disclosure relates to a method for dose guidance for a radiotherapy system during a radiotherapy session and to a method of continuous estimation of final delivered radiation dose during a radiotherapy session. Either one of the methods can be used to repeatedly estimate a final delivered radiation dose for the radiotherapy session in substantially real-time. This information can be used as decision support in a radiotherapy session. The method comprises the step of performing real-time dose reconstruction to obtain a delivered radiation dose generated by a radiotherapy beam of the radiotherapy system in at least one volume. A computer implemented version of a method for real-time dose reconstruction is used to calculate a dose delivered to a moving volume. The real-time dose reconstruction may be based on a live stream of position and accelerator parameters. The method further comprises the step of repeatedly estimating a remaining radiation dose of the radiotherapy session based on an observed or simulated motion of the at least one volume. The inventors have found that this can be done by convolving the part of the pre-calculated planned dose that remains to be delivered with the motion observed. The method can then also repeatedly estimate a final delivered radiation dose for the radiotherapy session as a sum of the delivered radiation dose and the estimated remaining radiation dose. The estimated final delivered radiation dose provides valuable information that can be used by a system or by a clinician to adjust and improve the remaining part of the radiotherapy system, for example by couch correction or re-optimization of a treatment plan for the remaining part of the radiotherapy session. The "final" dose may be a cumulative dose after the current treatment session, but may also be an accumulated dose of other (previous and/or future) treatment sessions.

A 'volume' within the context of the present disclosure may be a volume of any suitable size. The volume may cover, for example, a single target, multiple targets, a single volume at risk, multiple volumes at risk, or a small specific volume, including on or more specific point(s) of interest.

Figure 1A:
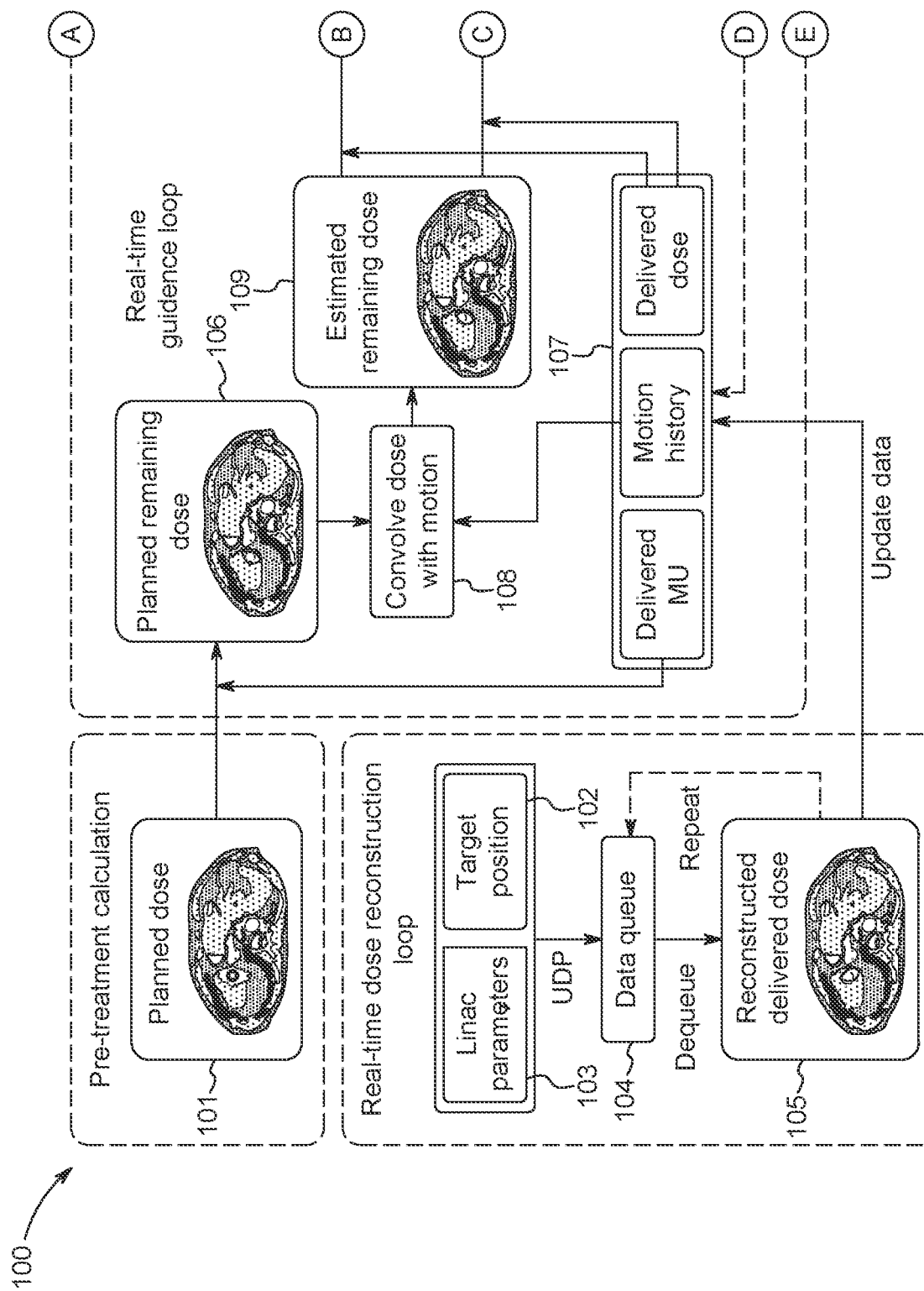
FIG. 1 shows an example of a workflow according to the presently disclosed method of continuous estimation of final delivered radiation dose.
Figure 1B:
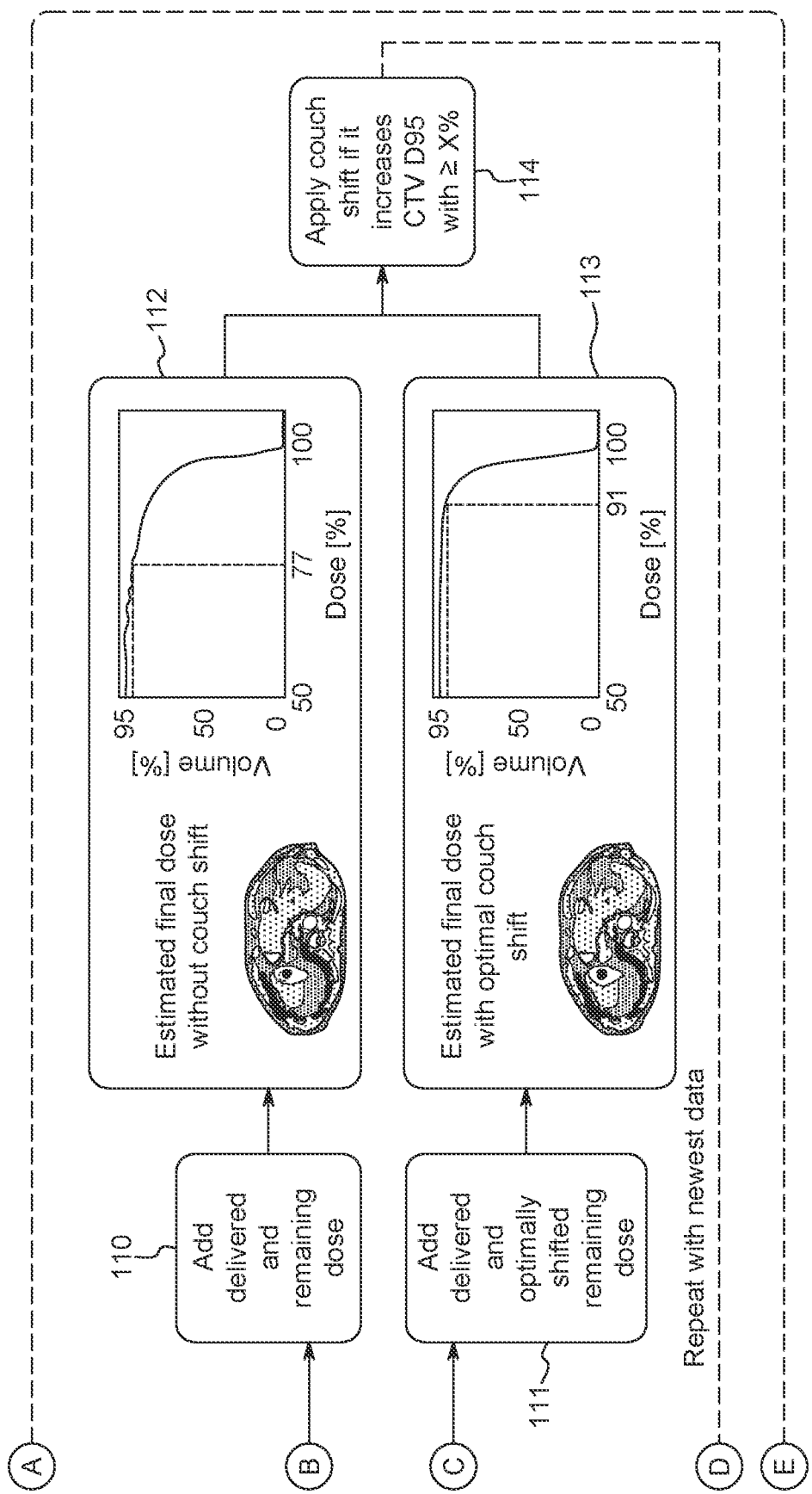

FIG. 1A-B provides an example of a workflow according to the presently disclosed method (100) of continuous estimation of final delivered radiation dose. The drawing, as the rest of the drawings, is exemplary and is intended to illustrate some of the features of the presently disclosed methods of dose guidance and continuous estimation of final delivered radiation dose, and is not to be construed as limiting to the presently disclosed invention. Before the radiotherapy session a planned static dose for a plan is calculated (101). Hence, a predefined planned dose for a target and/or at least one volume may be calculated. During the session a synchronized stream of accelerator parameters (103) and positions (102) of the at least one volume are sent to a data queue (104). In a continuous loop, the method reconstructs the cumulative dose distribution (105) delivered to the at least one volume, which may be moving, up to the current time point, DDeliveredReconstructed. Hence, the step of performing real-time dose reconstruction may be repeated upon receiving new input data. The input data may comprise parameters related to equipment for performing the radiotherapy session, such as parameters related to translational, rotational and/or deformational motion of one or more targets and/or one or more objects at risk, for example, including a stream of accelerator parameters and target position parameters. The input data may thus comprise a first stream of data comprising parameters related to the equipment for performing the radiotherapy session, for example, accelerator parameters. The input data may comprise a second stream of data comprising parameters related to the irradiated object, for example, parameters related to the translational, rotational and/or deformational motion of one or more targets or one or more objects at risk. After each dose calculation the delivered number of monitor units, the motion and the cumulative reconstructed dose are added to the internal history (107). The real-time dose guidance loop continuously checks the internal history (107) and estimates the remaining fraction dose, DRemainingEstimated, by convolving (108) the part of the pre-calculated planned dose that remains to be delivered (106) with the motion observed so far. A step of observing motion of the target may therefore comprise motion with a time window preceding a point in time when the remaining radiation dose is estimated (109). As a non-limiting example, it is possible to use motion of the volume observed in a time window of, for example, the past 40 seconds. The final delivered radiation dose can then be estimated as the sum of the delivered dose and the estimated remaining dose (109). This can be done without couch correction (110; 112) and with couch correction (111; 113). Other possibilities exist here. For example, it is possible to perform a re-optimization of a treatment plan for the remaining part of the radiotherapy session. In the example of FIG. 1A-B, finally the couch correction is applied if the minimum dose to 95% of the clinical target volume (CTV D95) increases more than a predetermined threshold by the couch correction (114).

Figure 2:
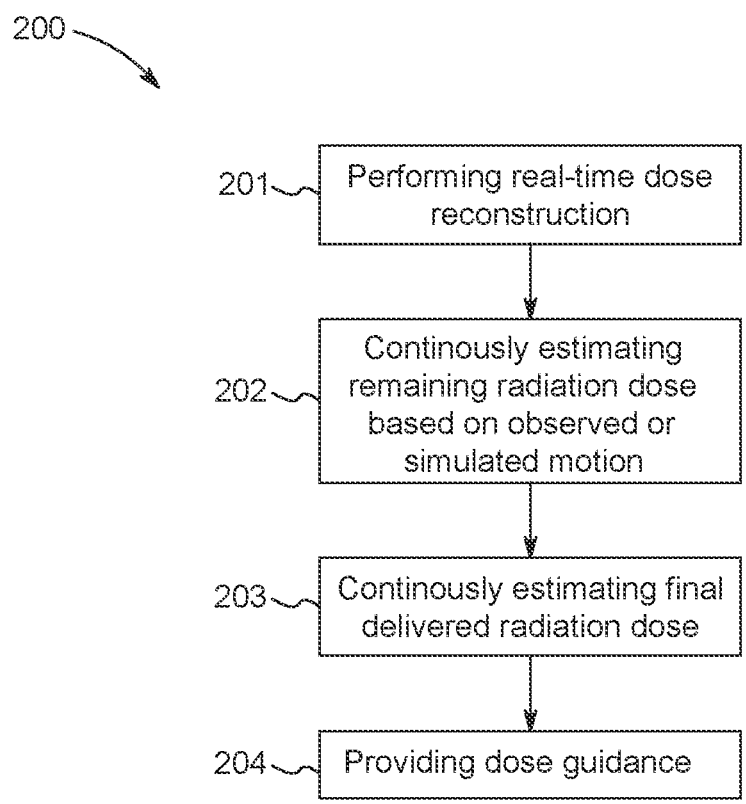
FIG. 2 shows flow chart of a method for dose guidance for a radiotherapy system.

FIG. 2 shows an exemplary flow chart of a method for dose guidance for a radiotherapy system (200). The method comprises the steps of: performing real-time dose reconstruction (201) to obtain a delivered radiation dose generated by a radiotherapy beam of the radiotherapy system in at least one volume; continuously estimating a remaining radiation dose (202) of the radiotherapy session based on an observed or simulated motion of the at least one volume; continuously estimating a final delivered radiation (203) dose for the radiotherapy session as a sum of the delivered radiation dose and the estimated remaining radiation dose; and providing dose guidance (204) for a remaining part of the radiotherapy session based on the estimated final delivered radiation dose.

A 'final dose' may be a cumulative dose after on ongoing treatment session, possibly added to the dose of other (previous and/or future) treatment sessions. If dose guidance is done for a number of treatment sessions, an objective in the ongoing session may be to deliver a session dose that is adapted to a cumulative total dose. For example, if part of a target received too little dose at the previous sessions then dose guidance could aim for more dose (than planned) in that part of the target at the current session. Similarly, if an organ at risk received higher/lower dose than acceptable in previous sessions then the dose guidance should allow less/more dose than planned in that risk organ at the current session.

Figure 3:
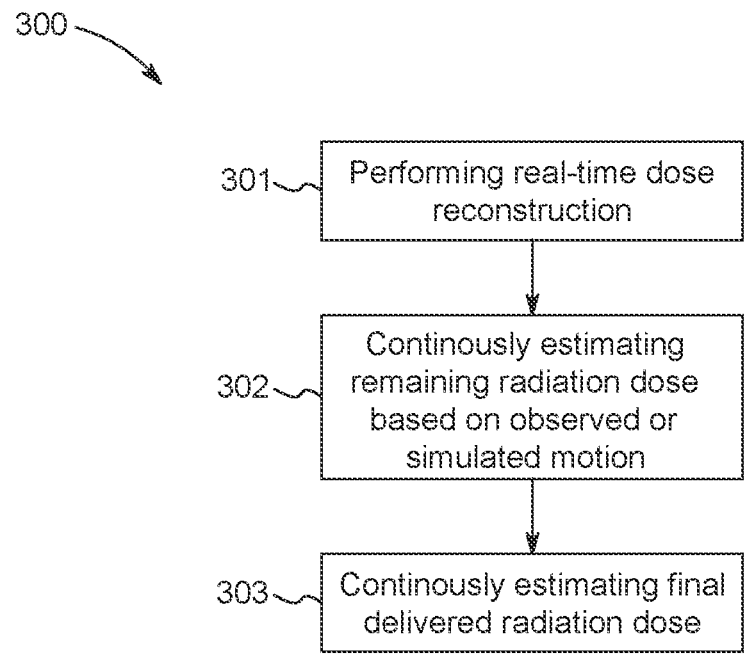
FIG. 3 shows flow chart of a method according to embodiments of the presently disclosed method of continuous estimation of final delivered radiation dose.

FIG. 3 shows an exemplary flow chart of a method of continuous estimation of final delivered radiation dose during a radiotherapy session (300). The method comprises the steps of: performing real-time dose reconstruction (301) to obtain a delivered radiation dose generated by a radiotherapy beam of the radiotherapy system in at least one volume; continuously estimating a remaining radiation dose (302) of the radiotherapy session based on an observed or simulated motion of the at least one volume; and continuously estimating a final delivered radiation (303) dose for the radiotherapy session as a sum of the delivered radiation dose and the estimated remaining radiation dose.

Observation and Simulation of Motion

Motion observation can be performed in various ways. As a non-limiting example, the observed or simulated motion is obtained from transponders or markers in the at least one volume, and/or an external surrogate and/or from imaging, such as magnetic resonance imaging, x-ray imaging, optical imaging and more. The transponders can be wired or wireless electromagnetic transponders. Other ways of observing the motion include fluoroscopic imaging of implanted fiducial radiopaque markers, observation of an external surrogate, or some combination of the above. The markers may be made of gold or any other material suitable for the purpose. Moreover, the motion does not necessarily have to be an observed motion. In one embodiment of the presently disclosed methods of continuous estimation of final delivered radiation dose and dose guidance, the motion is a simulated motion.

The motion may comprise a cyclic motion part, such as a substantially sinusoidal motion, and/or a baseline drift, and/or an erratic motion part. There are a number of reasons to why a volume moves. For example, such motion may be caused by respiration. The patient can also move with respect to the radiation beam. There may also be other intrafractional motion. For example, organs and targets may move because of changes in bone positions, or, the prostate may move due to bladder and rectum filling. The presently disclosed methods of continuous estimation of final delivered radiation dose and dose guidance may be real-time methods for handling intrafractional motion and may thus use not only the cyclic motion part but also the baseline drift and/or the erratic motion part for estimating the final delivered radiation dose. 'Baseline drift' in this regard may be defined as a gradual change of the position averaged over several motion cycles. 'Erratic motion part' can be defined as motion that is neither cyclic nor 'baseline drift'.

Continuously Estimating Remaining Radiation Dose

The presently disclosed methods of continuous estimation of final delivered radiation dose and dose guidance comprise the step of repeatedly estimating a remaining radiation dose of the radiotherapy session based on an observed or simulated motion of the at least one volume. The estimated 'remaining radiation dose' may be seen as the remaining radiation dose that will be delivered if the radiotherapy session continues as planned without modification. However, when the final delivered dose has been calculated (as the sum of the delivered radiation dose and the estimated remaining radiation dose for the at least one volume), the dose guidance or decision support may comprise estimating a remaining dose for alternative simulated scenarios with changes such as couch correction. This is described in further detail below.

In this step the remaining planned dose may be convolved with a representation of expected motion of the at least one volume in the remaining part, such as convolved with an estimated probability density function for the at least one volume in the remaining part of the treatment session. The remaining radiation dose of the radiotherapy session, including the effects of motion, may be estimated as the remaining planned dose without any motion convolved with a probability density function that describes an expected motion of the at least one volume in the remaining part of the treatment session. Such a convolution may include shifting and summing the remaining planned dose with weights corresponding to observed or simulated positions of the at least one volume until a given point in time. A convolution is a mathematical operation on two functions (e.g. f and g) that produces a third function (f*g). It can be understood as the sum of individual superpositions of the two functions or a superposition integral. The power of a convolution over a regular set of superpositions is that it can be performed much faster by use of Fourier space. The sum may be expressed as a superposition of the remaining planned dose in the positions visited by the at least one volume until a point in time, for the remaining part of the treatment session. The remaining planned dose may be convolved not only with a representation of expected motion of the at least one volume in the remaining part of the treatment session, but also with additional parameters or entities, such as the radiobiological response of the tissue.

As would be recognized by a person skilled in the art, convolving with an estimated probability density function is one of several ways of estimating the remaining radiation dose based on an observed and/or simulated motion of the at least one volume. When taking into account the observed and/or simulated motion, it can either be assumed that the motion will continue in the same way. However the motion can also include other assumptions, such as extrapolation of drift or other calculated or estimated trends. It is possible that no motion is expected for the remaining part of the treatment session. The probability density function may be based on the observed or simulated motions. It is also possible to simulate a motion of the remaining part of the radiotherapy session using an assumed motion of the at least one volume. The probability density function may comprise a distribution of positions of the at least one volume observed up to the current time during the radiotherapy session. A probability density function may describe future motion based on the motion that has been observed or simulated so far. The probability density function may thus describe all positions that the at least one volume is expected to take with appropriate weights that correspond to a relative amount of time that has been spent in each position. According to one embodiment, the method and system assumes that the observed motion will continue during the rest of the radiotherapy session. An alternative way of estimating a remaining radiation dose of the radiotherapy session based on an observed and/or simulated motion of the at least one volume is to (based on the observed and/or simulated motion until the current time) simulate the motion of the remaining part of the radiotherapy session and perform dose reconstruction based on the simulation.

The probability density function may comprise a distribution of positions of the at least one volume observed up to the current time during the radiotherapy session. The probability density function may also be based on previous radiotherapy or imaging session(s). Moreover, the probability density function may also take into account motion patterns previously observed for a predefined patient group. This may be relevant for, for example, prostate treatments due to large similarities in the motion pattern for prostate across patients. The probability density function may comprise any of the above data, alone or in combination.

Re-Optimization, Re-Positioning, Gating

The presently disclosed method for dose guidance for a radiotherapy system may further comprise steps and decision support for improving the remaining part of the radiotherapy session. This may include a number of approaches.

FIG. 1A-B shows an example of one embodiment of such decision support. It can be seen that based on the continuously estimated remaining radiation dose (109), it is possible to estimate a final estimation dose without intervention in the form of a couch shift (112) and with an optimized couch shift (113).

One embodiment of the presently disclosed method for dose guidance comprises the step of calculating a re-positioning of an object exposed to the radiotherapy and/or repositioning of the radiotherapy beam for improving the estimated remaining radiation dose based on the delivered radiation dose and the observed or simulated motion. This step may, more specifically, comprise a calculation of a correction of a couch carrying a patient and/or a calculation of a correction of a beam irradiating a patient.

Another way of providing decision support for the treatment is to calculate gating on/off the radiotherapy beam during the radiotherapy session based on the delivered and/or predicted radiation dose and the observed or simulated motion. The radiation beam may then be gated to ensure irradiating target(s) and avoid irradiating critical organs. In practice this means that the beam may be turned off if the target and risk organs are in a state that results in an unacceptable dose. The beam may be turned on again when the target and risk organs are in a state that results in an acceptable dose.

According to a further embodiment the presently disclosed method for dose guidance comprises the step of performing a re-optimization of a treatment plan for the remaining part of the radiotherapy session.

The method may further comprise the step of re-estimating the remaining radiation dose for an emulated intervention, such as re-positioning of an object exposed to the radiotherapy and/or a re-positioning of the beam and/or a re-optimization of a treatment plan for the remaining part of the radiotherapy session. The method may further comprise the step of extracting an optimized position for the remaining part of the radiotherapy session by using an optimization algorithm. This way a cost function representative of radiation dose loss in at least one target in the volume and/or excessive dose to healthy tissue can be generated. By finding a minimum in such a function, an optimized position may be extracted. The example of FIG. 1A-B shows the calculation of a final delivered radiation doses with and without optimal re-positioning of the object.

The method may further comprise the step of re-estimating the remaining radiation dose for an emulated re-positioning of an object and/or an organ at risk exposed to the radiotherapy and/or a re-positioning of the beam and/or a re-optimization of a treatment plan for the remaining part of the radiotherapy session.

Multiple Targets and Regions of Risk

As stated, the presently disclosed methods of continuous estimation of final delivered radiation dose and dose guidance are particularly useful for handling intrafractional motion.

The methods are also well-suited for continuously estimating a final delivered radiation dose for a target and an adjacent organ, such as an organ at risk. Not only the delivered final dose in any target, but also the delivered final dose in any organ at risk, may be important to continuously estimate. The method may accordingly further comprise the step of performing weighted optimization of a re-positioning of an object exposed to the radiotherapy with respect to the final delivered radiation doses of the target and the adjacent organs and/or a re-positioning of the beam and/or a re-optimization of a treatment plan for the remaining part of the radiotherapy session. The method may also comprise the step of continuously estimating a final delivered radiation dose for multiple targets. The multiple targets may also be weighted. Hence, the presently disclosed methods of continuous estimation of final delivered radiation dose and dose guidance may further comprise the step of performing weighted optimization of a re-positioning of an object exposed to the radiotherapy with respect to the final delivered radiation doses of the target and a second target. The step of performing weighted optimization of a re-positioning of an object exposed to the radiotherapy may be applied to any suitable number of targets.

Real-Time Dose Reconstruction

The step of performing real-time dose reconstruction may comprise the steps of:

selecting one or more points in the space exposed to radiotherapy;

projecting at least one of the points to at least one plane intersected by the central axis of a radiotherapy beam projecting from the radiotherapy beam source;

calculating dose in the plane(s) generated by the radiotherapy beam;

depth scaling the dose in the plane from the projected points to the selected points, thereby obtaining delivered doses in the selected points; and iteratively repeating steps b)-d).

The step of performing real-time dose reconstruction is not limited to this specific method. The method for real-time dose reconstruction may be implemented to work on a target regarded as homogenous, but may also be implemented to work on heterogeneous targets.

Figure 5:
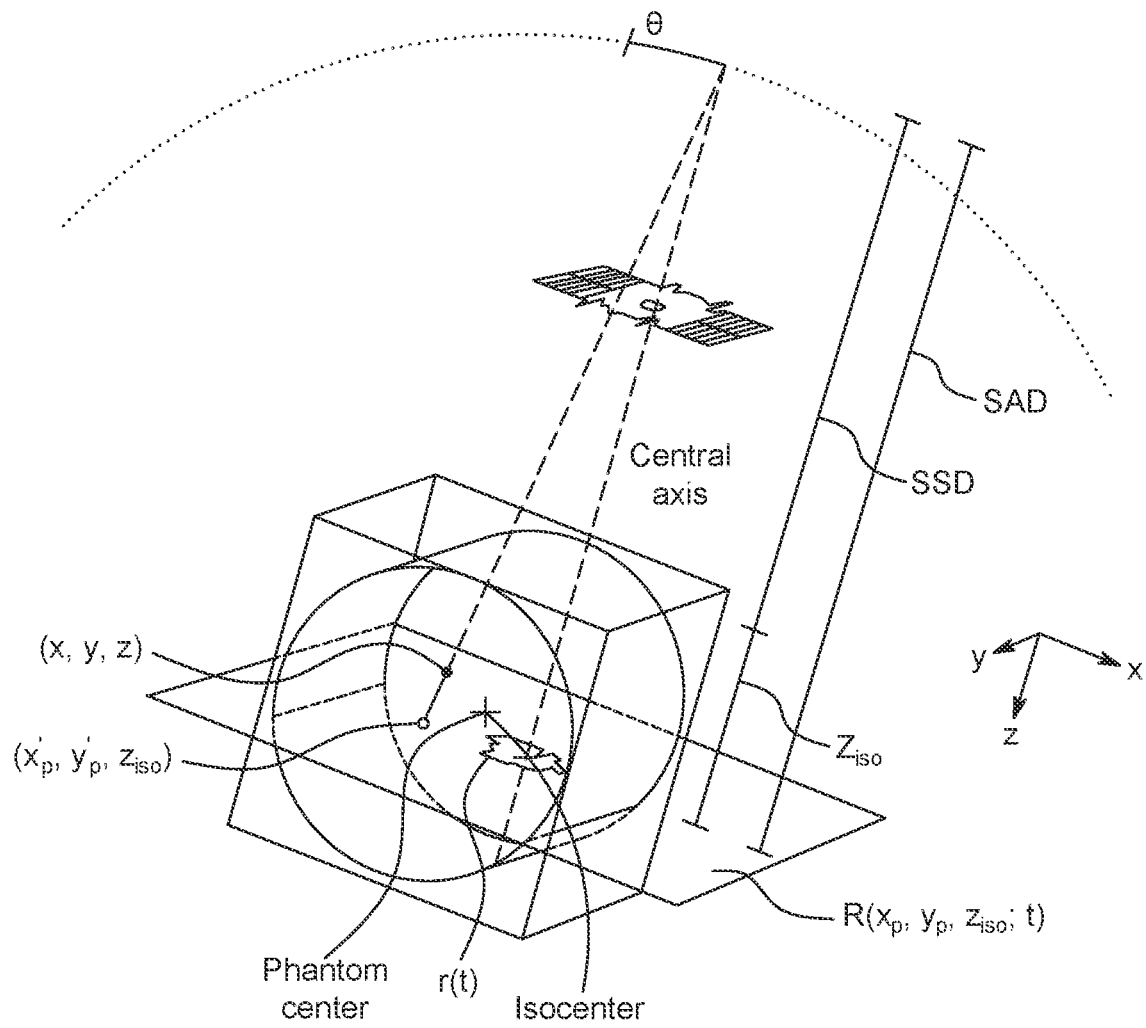
FIG. 5 shows an example of a schematic representation of a model of radiotherapy of an object for real-time dose reconstruction.

By selecting one or more points in space (step a) in the method), rather than calculating the dose to a full volume (3D grid of voxels), the number of calculations can be restricted substantially. By projecting the selected points onto a plane intersected by the central axis of the beam, interpolation along the beam lines during ray tracing is avoided. By utilizing the fact that the target of the radiotherapy can be regarded as homogeneous during QA, no ray tracing for inhomogeneity correction is needed to calculate the dose. This assumption of homogeneity is in line with common QA procedures. As a consequence, the depth scaling step becomes less computationally intensive for the calculations of the dose in the selected points. FIG. 5 shows an example of a schematic representation of a model of radiotherapy of an object. In FIG. 5 the calculation point with coordinates (x, y, z) is a point for which the dose can be calculated according to the presently disclosed method. The idea is that by choosing the points in step a) such that they cover specific points, dose reconstruction values can be obtained, which can be used to provide sufficiently accurate estimations of dose errors while restricting calculations significantly. The points may be selected adjacent to or inside an object that is the target of the radiotherapy, or some other region of interest, e.g. an organ at risk of too high dose, but the points could also be basically any points that could be exposed to radiation.

In step b) the points are projected to at least one plane intersected by the central axis of a radiotherapy beam. As mentioned above one advantage related the projection to (a) plane(s) is that no ray tracing is needed to calculate the dose. In FIG. 5 this corresponds to point (x, y, z) being projected to a plane, resulting in the projected point $(x_p', y_p', z_{iso})$. The projection of the point on the plane can be expressed as $$(x_p', y_p', z_{iso}) = \left(x \frac{SAD}{SSD+z'}, y \frac{SAD}{SSD+z'}, z_{iso}\right)$$

where the source axis distance SAD in FIG. 5 is the distance between the beam source and the plane and the source-surface distance SSD in FIG. 5 is the distance between the source and the targeted object.

One aspect of the presently disclosed invention relates to projecting the selected points to 1, 2, 3 or 4 planes. By limiting the number of planes, the convolutions of electron scatter kernels, such as single pencil beam 2D scatter kernels according to the Storchi algorithm, which are computational intensive, are limited.

In one embodiment, the plane is the isoplane. The isocenter in this context requires a circular rotation of a gantry around the target of the radiotherapy. The isocenter is defined as the point in the center of the circle. The isoplane is defined as the plane perpendicular to the central axis of the radiotherapy beam, wherein the isocenter is part of the plane. One advantage of using the isoplane as the plane to which the selected points are projected is that it has a fixed distance to the beam source. In a further embodiment, the plane is a plane perpendicular to the central axis of the radiotherapy beam, wherein a specific point in the target or volume at risk is part of the plane. In this embodiment the distance to the beam source is not fixed but the lateral electron scatter computed by convolution of the plane with the scatter is more accurate within the target or volume at risk.

The depth scaling may be performed by executing the steps:
  calculating absolute depth dose on the central axis of the radiotherapy beam as a function of the distance from the beam source;
  calculating the dose delivered in the selected points based on the dose in the plane and the absolute depth dose.

The central axis of the radiotherapy beam in FIG. 5 can serve as an example of a central axis for this purpose.

By using a function (of the distance z from the beam source) for the absolute depth dose on the central axis of the radiotherapy beam, continuous dose interpolation along the beam lines (ray tracing) is avoided, which saves a significant amount of computation time. In a further embodiment, interpolation is performed at discrete points along the beam lines for increased accuracy with negligible performance penalty.

Specifically, the absolute depth dose on the central axis of the radiotherapy beam may be calculated based on a measured percentage depth dose. In one embodiment the absolute depth dose is calculated based on a single measured percentage depth dose in water. Alternatively, the absolute depth dose function can be calculated based on a set of percentage depth doses, which increases the accuracy of the disclosed method compared to using a single measured percentage depth dose. More specifically, in one embodiment, the absolute depth dose on the central axis of the radiotherapy beam is expressed as $D_a(z; t) = PDD_{norm}(z) \cdot c_M(z; t) \cdot c_i(t)$ where $c_M(z; t)$ is Mayneord's F factor and $c_i(t)$ is an inverse square law correction factor. Preferably, the absolute depth dose on the central axis of the radiotherapy beam is calculated as a function of time.

The dose delivered in the selected points can then be calculated based on the absolute depth dose function and the calculated dose in the plane. The absolute depth dose function is typically expressed as a function of time and the distance from the beam source. In one embodiment the dose delivered in the selected points is calculated as $D(x,y,z; t) = R(x_p', y_p', z_{iso}; t) \cdot D_a(z; t) \cdot \dot{D} \, dt \cdot c_d(z) \cdot c_\theta$ (optional) where $R(x_p', y_p', z_{iso}; t)$ is the dose in the plane, $D_a(z; t)$ is the absolute depth dose on the central axis of the radiotherapy beam, $\dot{D}$ is the dose rate, $c_d(z)$ is a density correction factor, and $c_\theta$ is a gantry dependent attenuation correction factor (wherein $c_\theta$ is an optional parameter).

Decision Support System

The present disclosure further relates to decision support system for a radiotherapy system comprising:
  an interface for receiving radiotherapy beam parameters and/or parameters related to observed or simulated motion of at least one volume; and
  a processing unit configured to:
  a. perform real-time dose reconstruction to obtain a delivered radiation dose generated by a radiotherapy beam of the radiotherapy system in at least one volume;
  b. continuously estimate a remaining radiation dose of the radiotherapy session based on an observed or simulated motion of the at least one volume; and
  c. continuously estimate a final delivered radiation dose for the radiotherapy session as a sum of the delivered radiation dose and the estimated remaining radiation dose.

As would be acknowledged by a person skilled in the art, the processing unit of the system may be configured to perform the method for dose guidance for a radiotherapy system and the method of continuous estimation of final delivered radiation dose during a radiotherapy session according to any embodiment described in the present disclosure.

The decision support system may be an integral part, or an add-on, to any radiotherapy system. The radiotherapy system may comprise a beam source configured to rotate around the targeted object in a circle and/or configured to move around the targeted object in non-coplanar fields, and/or wherein a treatment couch is moved in relation to the beam source.

Figure 4:
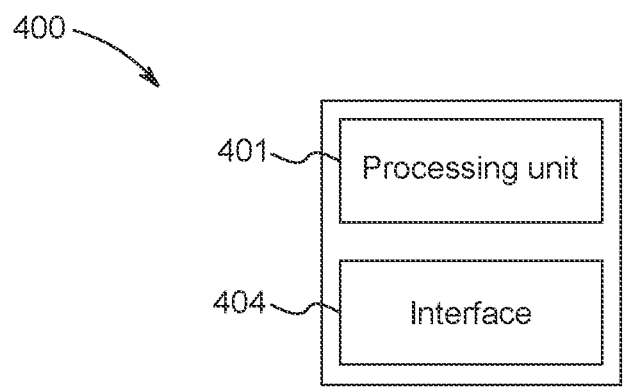
FIG. 4 shows a schematic view of an embodiment of the presently disclosed decision support system for a radiotherapy system.

FIG. 4 shows a schematic view of an embodiment of the presently disclosed decision support system (400) for a radiotherapy system comprising a processing unit (401) and an interface (402) for receiving radiotherapy beam parameters and/or parameters related to observed or simulated motion of at least one volume. The decision support system may further comprise interfaces for controlling a position of the patient and/or for controlling beam(s) and/or gating of the radiotherapy system.

Example and Simulation

One non-limiting example of the presently disclosed methods of continuous estimation of final delivered radiation dose and dose guidance has been evaluated in simulations.

Treatment delivery with real-time dose guided couch adaptation was simulated for 15 liver stereotactic body radiation therapy patients previously treated with intrafraction motion monitoring by implanted electromagnetic transponders (Calypso Soft Tissue Beacon Transponder, Varian Medical Systems). The planning target volume (PTV) was generated by expanding the CTV with 5 mm axial and 7 mm (n=12) or 10 mm (n=3) cranio-caudal (CC) margins. The prescribed CTV mean dose was 48 Gy for four patients with primary liver tumors and 45 Gy (n=1), 56.25 Gy (n=9), or 61.8 Gy (n=1) for eleven patients with one (n=9), two (n=1) or three (n=1) metastases. Seven-field intensity modulated or 3D conformal plans covered at least 99% of the CTV with 95% of the prescription dose and the PTV with 67% of the prescription dose. The treatments were delivered in three fractions on a TrueBeam linear accelerator (Varian) with Calypso guided respiratory gating.

The following tumor motion trajectories were simulated: (1) Sinusoidal motion in the CC direction with 4 s period and 20 mm peak-to-peak amplitude and with the mean position being offset 4 mm and 8 mm in the cranial direction. The couch shift optimization during the simulations with sinusoidal motion was constrained to the cranio-caudal direction; (2) the Calypso-measured internal tumor motion.

A simulation framework was used to broadcast a stream of synchronized accelerator parameters and tumor positions as Unified Data Protocol (UDP) messages at a frequency of 21 Hz. The continuous dose reconstruction loop bunched the UDP messages together to the average accelerator state and tumor position since the last dose calculation and used this state for the dose increment calculation.

During the simulations, the computation times for dose calculations and dose guidance were logged along with a number of different DVHs and motion data which were used for research purposes to analyse different dose guidance methodologies offline. The computation times were quantified by calculating the mean for each fraction and then calculating the median and range. The computation times were split by Calypso-based (630 fractions) and sine-based motions (210 fractions) as the calculation points for the same patient were selected differently based on whether the motion applied was one-dimensional (sinusoidal) or three-dimensional (Calypso).

Figure 6A:
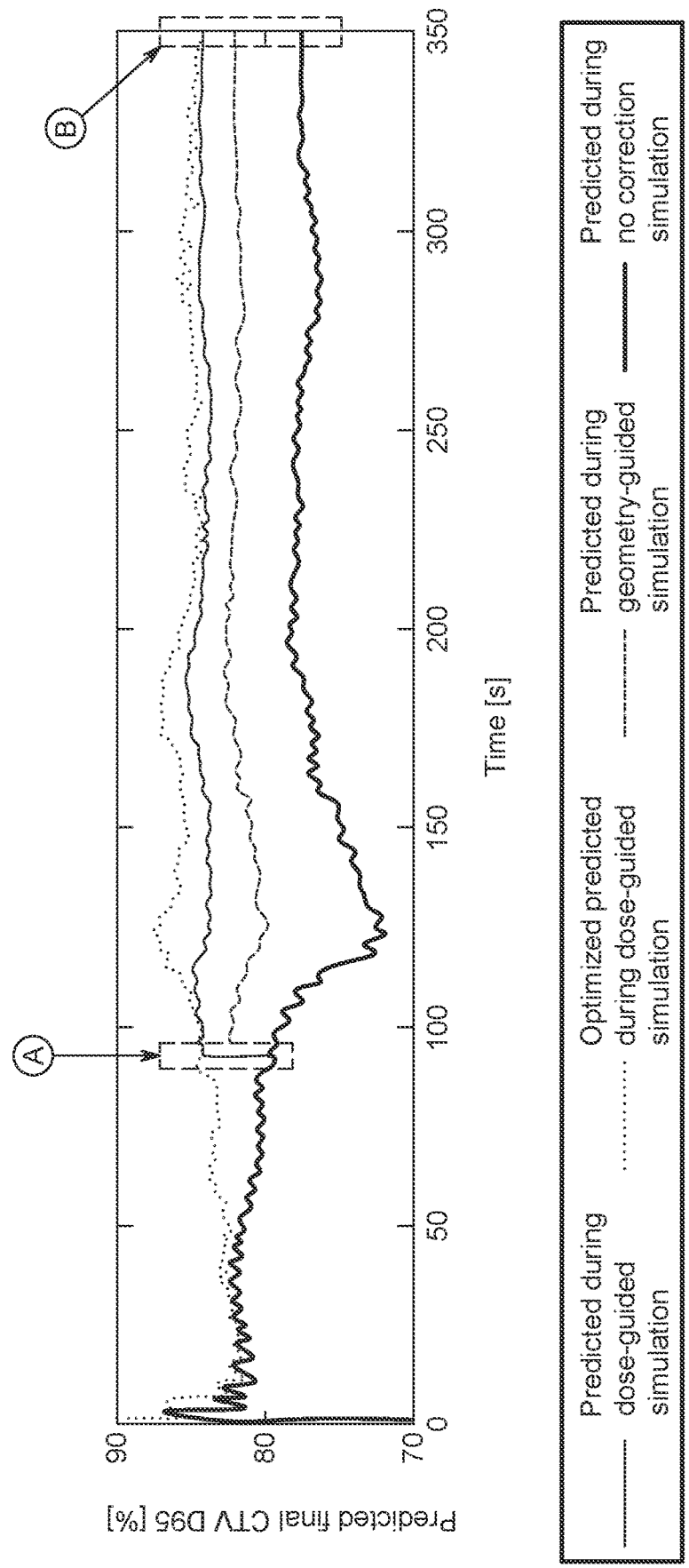
FIG. 6 shows an example of the repeatedly predicted final clinical target volume (CTV) D95 during a simulated treatment fraction for different scenarios.
Figure 7A:
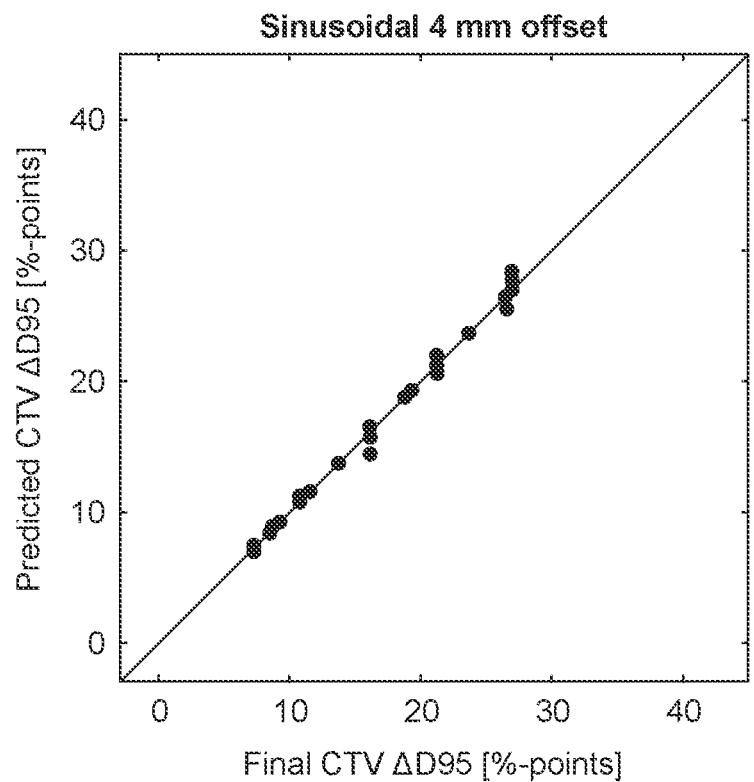
FIG. 7 show comparisons between the predicted final CTV ΔD95 and actual final ΔD95 for different scenarios.
Figure 7B:
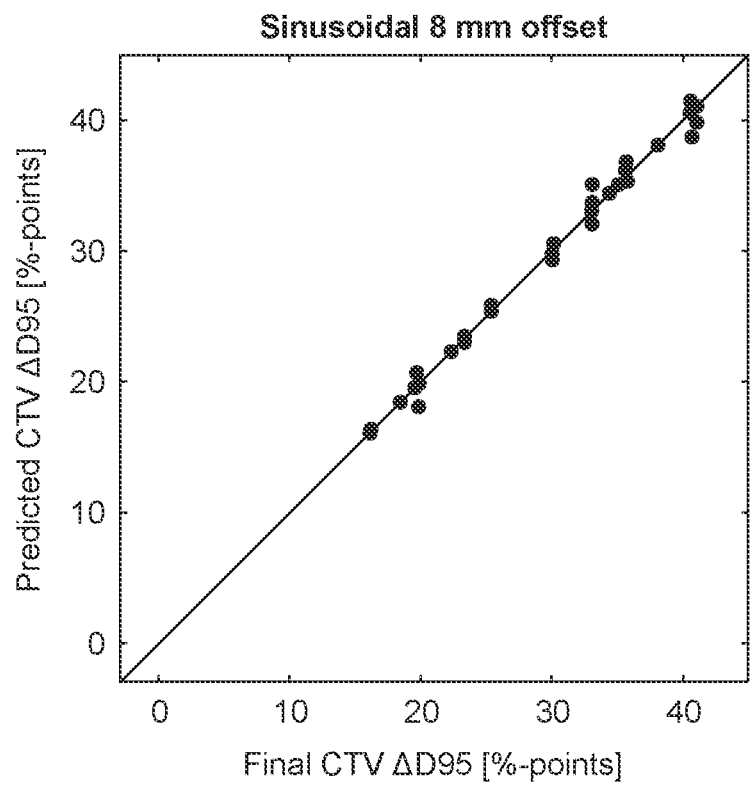
Figure 7C:
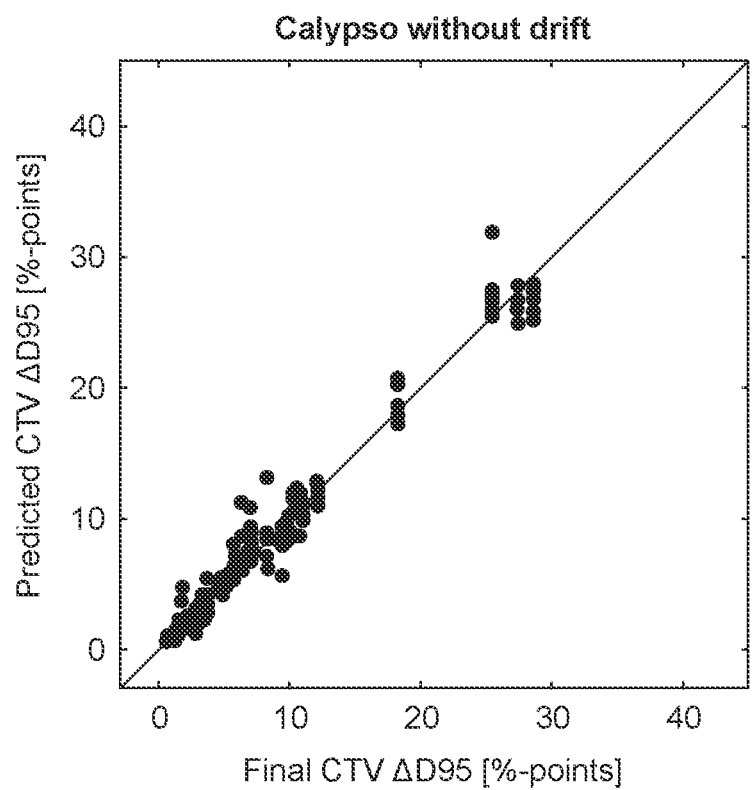
Figure 7D:
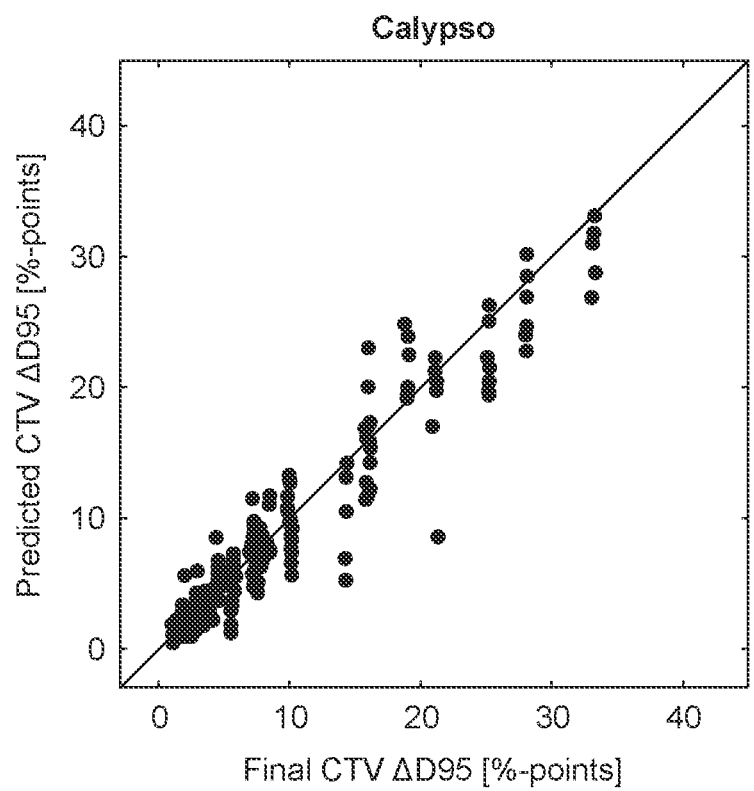
Figure 8A:
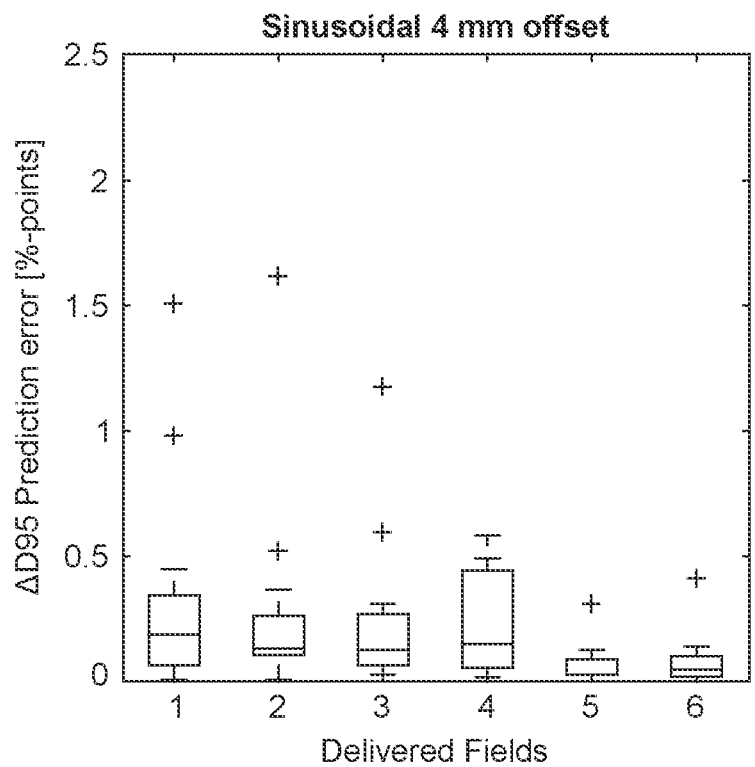
FIG. 8 show absolute errors in the real-time predicted CTV ΔD95 for a number of motions.
Figure 8B:
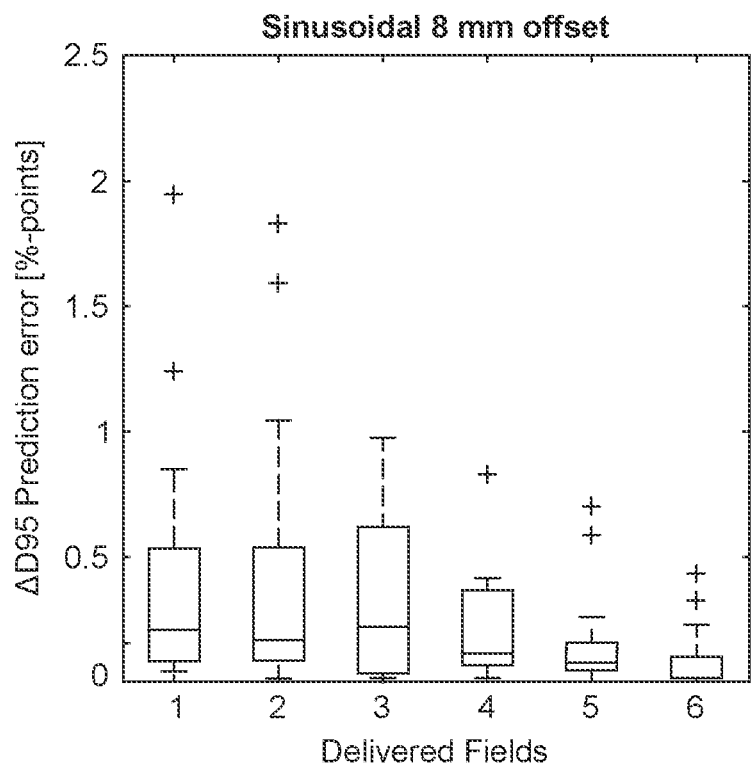
Figure 8C:
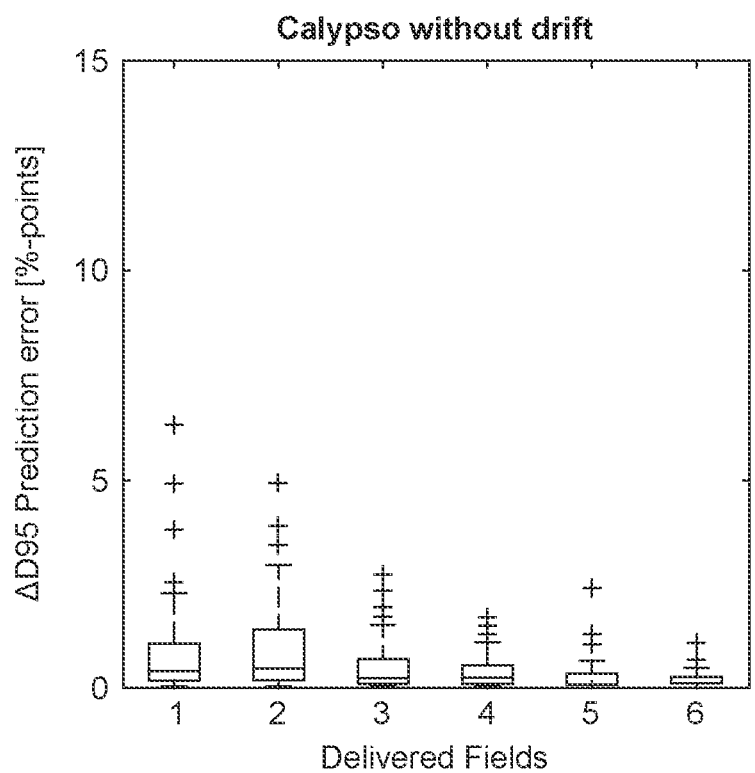
Figure 8D:
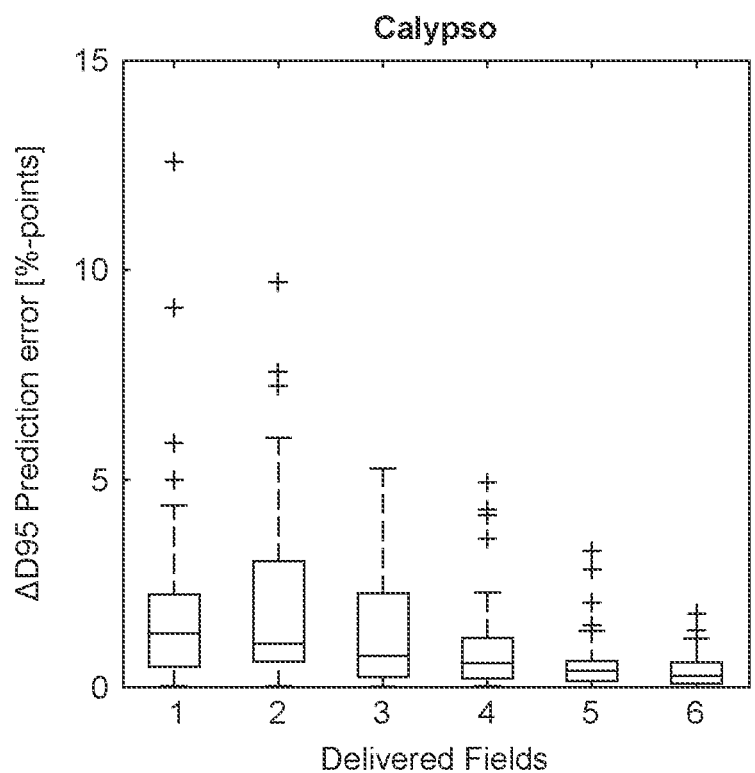

The lower curve in FIG. 6A shows an example of the continuously predicted final CTV D95 during a simulated treatment fraction without dose-guided couch corrections. FIG. 7 compares the predicted final CTV ΔD95 after each treatment field with the actual final reduction in D95 (ΔD95) for all treatment simulations. The accuracy of the real-time predicted CTV ΔD95 in general improved as a treatment fraction progressed, with less weight being put on the estimated remaining dose and more weight being put on the reconstructed dose delivered so far (FIG. 8). For the sinusoidal motion (FIGS. 7A-B), the maximum error in the predicted CTV ΔD95 was below 2%-points. The median error was about 0.2%-points after the first field and decreased as the treatment progressed. For Calypso motion without drift, the maximum prediction error was 6.3%-points with the largest median error being 0.4%-points after the second field (FIG. 7C). For Calypso motion with drift motion, the errors were larger with a maximum prediction error of 12.6%-points and a median error of 1.3%-points after the first field and with these errors decreasing steadily as more fields were delivered (FIG. 7D).

Figure 6B:
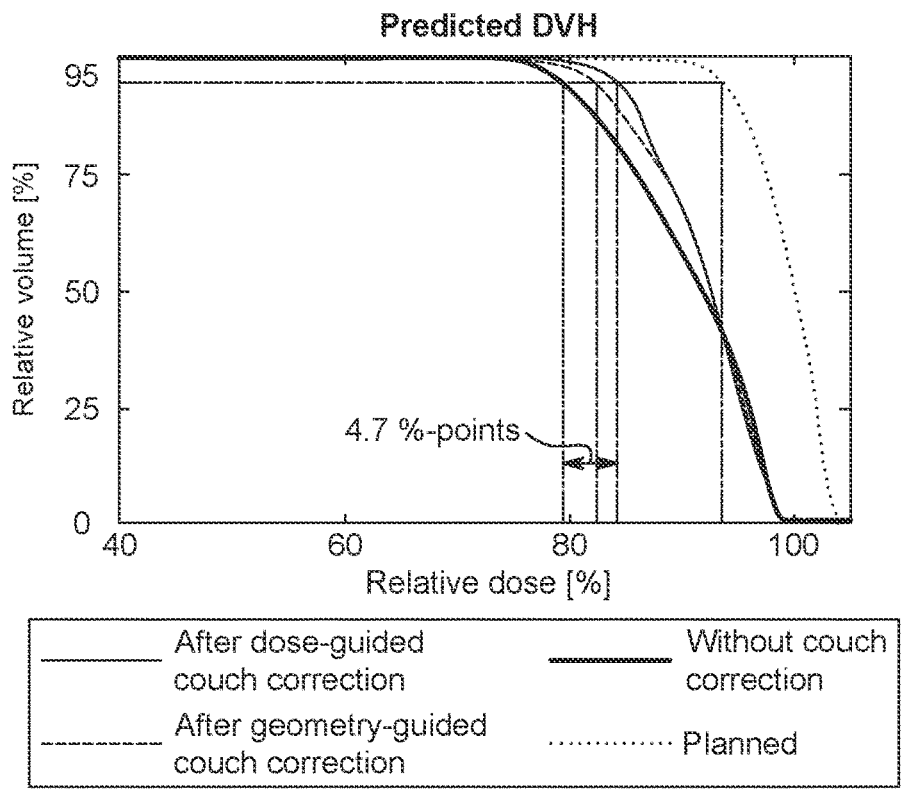
Figure 6C:
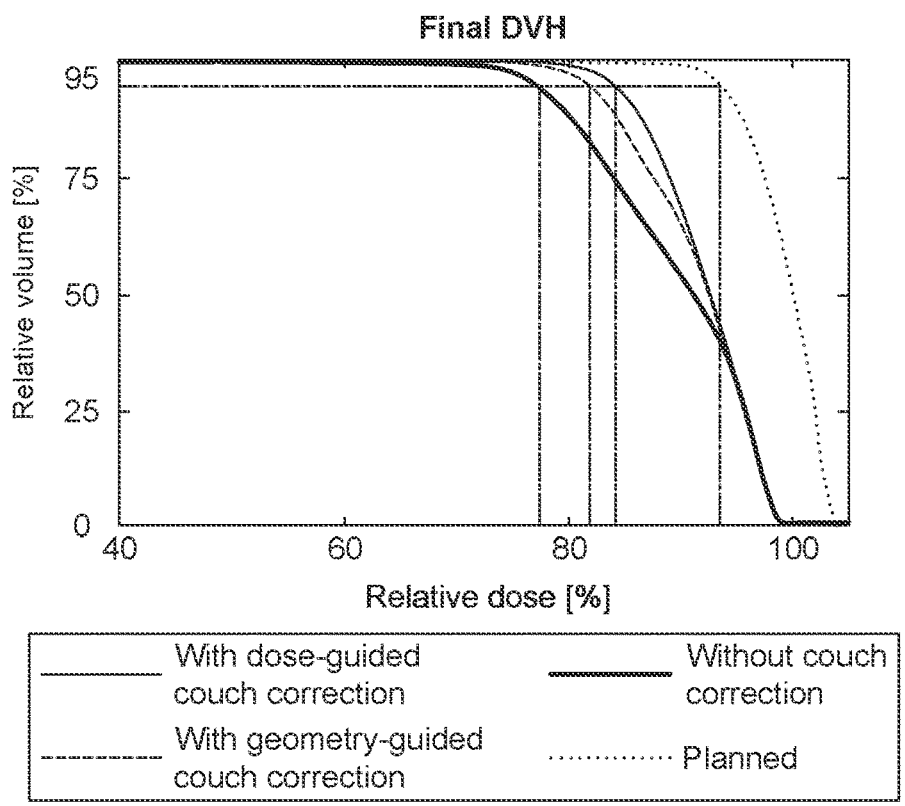

FIG. 6 (two upper curves) shows a simulation of dose guidance with Calypso-measured tumor motion and interfield couch corrections being triggered when it improves the estimated final CTV D95 with at least 4%-points. The upper curve shows the continuously estimated final CTV D95 with the optimal couch shift. The lower curve shows the estimated final CTV D95 without any couch shift. In this simulation, a dose-guided couch correction was triggered once after the second field (95 seconds into the treatment), because the continuously optimized D95 (upper) exceeded the estimated D95 without treatment changes (lower) with more than 4%-points. After the couch correction, the second curve from the top shows the estimated final dose without any further couch corrections. Since this curve is always less than 4%-point below the upper curve, no more couch corrections were triggered in this simulation of dose guidance. For comparison, the figure also shows D95 for an alternative simulation with a geometrically guided couch correction that resets the mean geometrical error after the second field (third from top). CTV DVHs for the different scenarios are presented right after the couch correction (FIG. 6B) and at the end of treatment (FIG. 6C).

Figure 9:
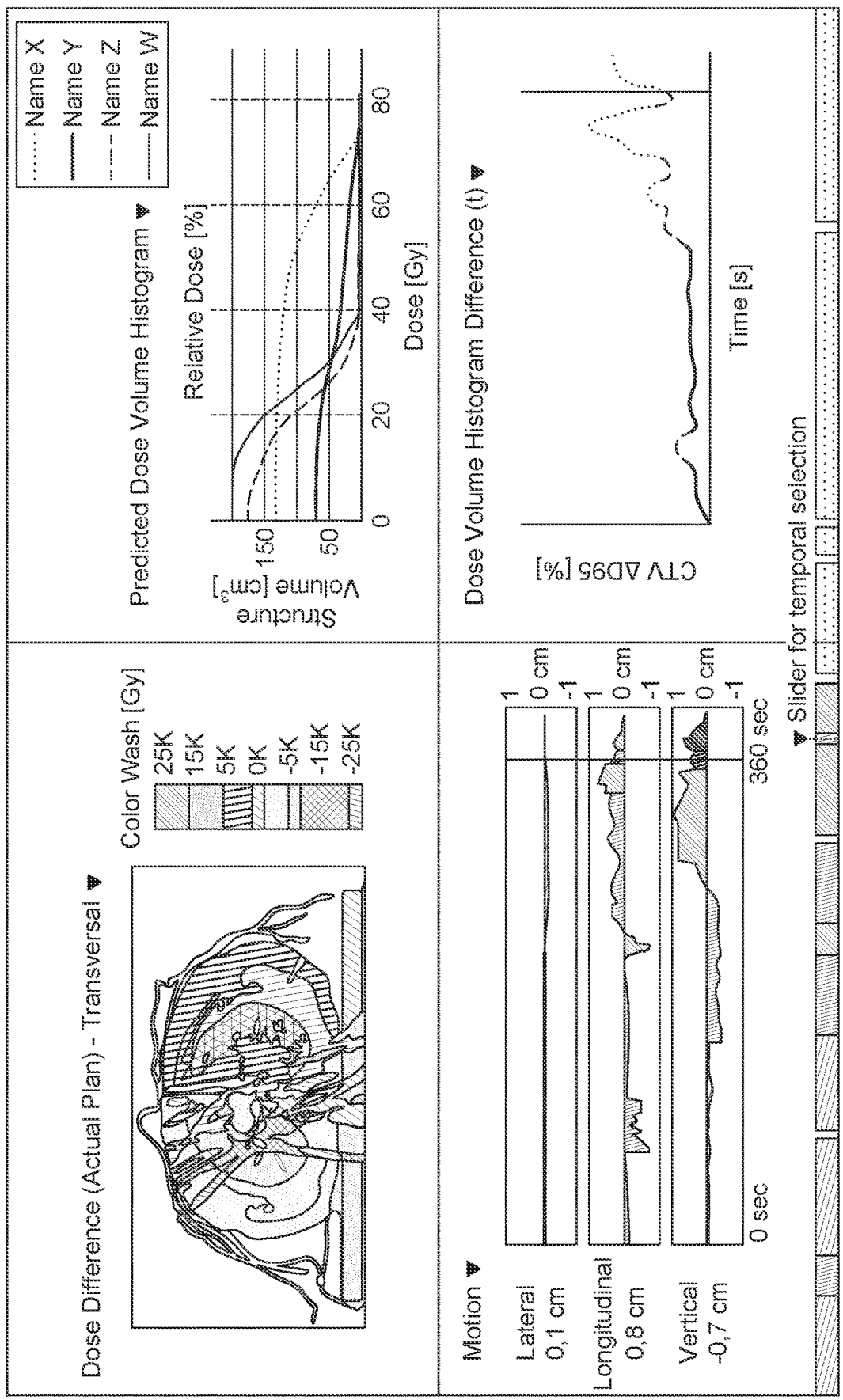
FIG. 9 shows an example of a user interface for providing dose guidance using the presently disclosed method for dose guidance for a radiotherapy system during a radiotherapy session.

FIG. 9 shows an example of a user interface for providing dose guidance using the presently disclosed method for dose guidance for a radiotherapy system during a radiotherapy session. At the bottom of the interface the user can select a time for which the dose difference in the upper left view is shown. In the upper left view a user can see a dose difference with respect to a pre-calculated planned dose. The dose difference is presented as a heat map for a volume or a cross-section of a volume.

REFERENCE

The following references are hereby incorporated by reference in their entirety:
International application PCT/DK2015/050251, "Method for real-time dose reconstruction during radio therapy".
Muurholm C G, Ravkilde T, Skouboe S, Worm E, Hansen R, Høyer M, Keall P J, Poulsen P R. "Real-time dose-guidance in radiotherapy: Proof of principle." Radiother Oncol. 2021 November; 164:175-182. doi: 10.1016/j.radonc.2021.09.024. Epub 2021 Sep. 28. PMID: 34597738.

The invention claimed is:

1. A method for a dose guidance for a radiotherapy system during a radiotherapy session, comprising the steps:
    performing substantially a real-time dose reconstruction to obtain a delivered radiation dose generated by a radiotherapy beam of the radiotherapy system in at least one volume;
    repeatedly estimating a remaining radiation dose of the radiotherapy session based on an observed and/or a simulated motion of the at least one volume;
    repeatedly estimating a final delivered radiation dose for the radiotherapy session as a sum of the delivered radiation dose and the estimated remaining radiation dose of the radiotherapy session;
    providing a dose guidance for a remaining part of the radiotherapy session based on the estimated final delivered radiation dose for the radiotherapy session; and
    calculating a re-positioning of an object exposed to the radiotherapy beam and/or re-positioning of the radiotherapy beam for improving the estimated remaining radiation dose of the radiotherapy session based on the delivered radiation dose and the observed and/or the simulated motion of the at least one volume.

2. The method for a dose guidance for a radiotherapy system during a radiotherapy session according to claim 1, wherein the observed and/or the simulated motion of the at least one volume is obtained from transponders, and/or an external surrogate, and/or from imaging.

3. The method for a dose guidance for a radiotherapy system during a radiotherapy session according to claim 1, wherein the observed and/or the simulated motion of the at least one volume comprises a cyclic motion part, and/or a baseline drift, and/or an erratic motion part, wherein the step of repeatedly estimating a final delivered radiation dose is based on the cyclic motion part, and/or the baseline drift, and/or the erratic motion part.

4. The method for a dose guidance for a radiotherapy system during a radiotherapy session according to claim 1, wherein the step of calculating the re-positioning of the object comprises a calculation of a correction of a couch of a patient.

5. The method for a dose guidance for a radiotherapy system during a radiotherapy session according to claim 1, further comprising the step of calculating gating of the radiotherapy beam during the radiotherapy session based on the delivered radiation dose and the observed and/or the simulated motion of the at least one volume.

6. The method for a dose guidance for a radiotherapy system during a radiotherapy session according to claim 1, further comprising the step of performing a re-optimization of a treatment plan for the remaining part of the radiotherapy session.

7. The method for a dose guidance for a radiotherapy system during a radiotherapy session according to claim 1, further comprising the step of re-estimating the remaining radiation dose for an emulated re-positioning of an object exposed to the radiotherapy beam.

8. The method for a dose guidance for a radiotherapy system during a radiotherapy session according to claim 1, further comprising the step of repeatedly providing estimated final delivered radiation doses with and without repositioning of the object and/or re-positioning of the radiotherapy beam.

9. The method for a dose guidance for a radiotherapy system during a radiotherapy session according to claim 1, wherein the step of performing a substantially real-time dose reconstruction is repeated upon receiving new input data, wherein the new input data comprises parameters related to an irradiated object or equipment for performing the radiotherapy session, and/or a stream of accelerator parameters and target position parameters.

10. The method for a dose guidance for a radiotherapy system during a radiotherapy session according to claim 1, wherein the radiotherapy session is a predefined radiotherapy session associated with a predefined planned dose for a target.

11. The method for a dose guidance for a radiotherapy system during a radiotherapy session according to claim 1, further comprising the step of repeatedly estimating a final delivered radiation dose for an adjacent organ.

12. The method for a dose guidance for a radiotherapy system during a radiotherapy session according to claim 11, further comprising the step of performing a weighted optimization of an intervention.

13. The method for a dose guidance for a radiotherapy system during a radiotherapy session according to claim 1, further comprising the steps of:
   repeatedly estimating a final delivered radiation dose for multiple targets; and
   performing a weighted optimization of an intervention.

14. The method for a dose guidance for a radiotherapy system during a radiotherapy session according to claim 1, further comprising the step of re-estimating the remaining radiation dose of the radiotherapy session for an emulated intervention.

15. The method for a dose guidance for a radiotherapy system during a radiotherapy session according to claim 14, further comprising the step of providing estimated final delivered radiation doses with and without the emulated intervention.

16. The method for a dose guidance for a radiotherapy system during a radiotherapy session according to claim 1, wherein the step of performing a substantially real-time dose reconstruction comprises:
   a) selecting one or more points in a space exposed to the radiotherapy beam;
   b) projecting at least one of the one or more points to at least one plane intersected by a central axis of a radiotherapy beam projecting from a radiotherapy beam source;
   c) calculating a dose in the at least one plane generated by the radiotherapy beam;
   d) depth scaling the dose in the at least one plane from the projected at least one of the one or more points to the selected one or more points in the space, thereby obtaining delivered doses in the selected one or more points in the space; and
   e) iteratively repeating steps b)-d).

17. A method for a dose guidance for a radiotherapy system during a radiotherapy session, comprising the steps:
   performing substantially a real-time dose reconstruction to obtain a delivered radiation dose generated by a radiotherapy beam of the radiotherapy system in at least one volume;
   repeatedly estimating a remaining radiation dose of the radiotherapy session based on an observed and/or a simulated motion of the at least one volume;
   repeatedly estimating a final delivered radiation dose for the radiotherapy session as a sum of the delivered radiation dose and the estimated remaining radiation dose of the radiotherapy session;
   providing a dose guidance for a remaining part of the radiotherapy session based on the estimated final delivered radiation dose for the radiotherapy session; and
   calculating gating of the radiotherapy beam during the radiotherapy session based on the delivered radiation dose and the observed and/or the simulated motion of the at least one volume.

18. A decision support system for a radiotherapy system comprising:
   an interface for receiving radiotherapy beam parameters and/or parameters related to an observed and/or a simulated motion of at least one volume; and
   a processing unit configured to:
      perform a substantially real-time dose reconstruction to obtain a delivered radiation dose generated by a radiotherapy beam of the radiotherapy system in at least one volume;
      repeatedly estimate a remaining radiation dose of a radiotherapy session based on the observed and/or the simulated motion of the at least one volume;
      repeatedly estimate a final delivered radiation dose for the radiotherapy session as a sum of the delivered radiation dose and the estimated remaining radiation dose of the radiotherapy session; and
      calculate gating of the radiotherapy beam during the radiotherapy session based on the delivered radiation dose and the observed and/or the simulated motion of the at least one volume.

19. A decision support system for a radiotherapy system comprising:
   an interface for receiving radiotherapy beam parameters and/or parameters related to an observed and/or a simulated motion of at least one volume; and
   a processing unit configured to:
      perform a substantially real-time dose reconstruction to obtain a delivered radiation dose generated by a radiotherapy beam of the radiotherapy system in at least one volume;
      repeatedly estimate a remaining radiation dose of a radiotherapy session based on the observed and/or the simulated motion of the at least one volume;
      repeatedly estimate a final delivered radiation dose for the radiotherapy session as a sum of the delivered radiation dose and the estimated remaining radiation dose of the radiotherapy session; and
      calculate a re-positioning of an object exposed to the radiotherapy beam and/or re-positioning of the radiotherapy beam for improving the estimated remaining radiation dose of the radiotherapy session based on the delivered radiation dose and the observed and/or the simulated motion of the at least one volume.

20. A decision support system for a radiotherapy system comprising:
   an interface for receiving radiotherapy beam parameters and/or parameters related to an observed and/or a simulated motion of at least one volume; and
   a processing unit configured to:
      perform a substantially real-time dose reconstruction to obtain a delivered radiation dose generated by a radiotherapy beam of the radiotherapy system in at least one volume;
      repeatedly estimate a remaining radiation dose of a radiotherapy session based on the observed and/or the simulated motion of the at least one volume;
      repeatedly estimate a final delivered radiation dose for the radiotherapy session as a sum of the delivered radiation dose and the estimated remaining radiation dose of the radiotherapy session; and re-estimate the remaining radiation dose for an emulated re-positioning of an object exposed to the radiotherapy beam.

\* \* \* \* \*